United States Patent [19]
Klein

[11] Patent Number: 6,047,349
[45] Date of Patent: Apr. 4, 2000

[54] SYSTEM FOR COMMUNICATING THROUGH A COMPUTER SYSTEM BUS BRIDGE

[75] Inventor: Dean A. Klein, Eagle, Id.

[73] Assignee: Micron Electronics, Inc., Nampa, Id.

[21] Appl. No.: 08/873,994

[22] Filed: Jun. 11, 1997

[51] Int. Cl.[7] .................................................. G06F 13/36
[52] U.S. Cl. .......................................... 710/129; 710/128
[58] Field of Search ..................... 710/112, 260, 710/129, 128; 370/401

[56] References Cited

U.S. PATENT DOCUMENTS

| | | | |
|---|---|---|---|
| 5,557,757 | 9/1996 | Gephardt et al. | 395/306 |
| 5,557,758 | 9/1996 | Bland et al. | 710/128 |
| 5,568,621 | 10/1996 | Wooten | 710/112 |
| 5,655,142 | 8/1997 | Gephardt et al. | 395/800.32 |
| 5,657,314 | 8/1997 | McClure et al. | 370/401 |
| 5,659,696 | 8/1997 | Amini et al. | 395/412 |
| 5,664,117 | 9/1997 | Shah et al. | 395/280 |
| 5,673,400 | 9/1997 | Kenny | 395/309 |
| 5,678,064 | 10/1997 | Kulik et al. | 395/848 |
| 5,717,873 | 2/1998 | Rabe et al. | 395/290 |
| 5,729,762 | 3/1998 | Kardach et al. | 395/842 |
| 5,740,385 | 4/1998 | Hayek et al. | 395/308 |
| 5,745,772 | 4/1998 | Klein | 395/739 |
| 5,748,945 | 5/1998 | Ng | 395/500 |
| 5,771,387 | 6/1998 | Young et al. | 710/620 |
| 5,835,738 | 11/1998 | Blackledge, Jr. et al. | 710/127 |
| 5,838,935 | 11/1998 | Davis et al. | 710/129 |
| 5,864,688 | 1/1999 | Santos et al. | 710/129 |

OTHER PUBLICATIONS

Intel Corporation, "82378ZB System I/O (SIO)and 82379AB System I/O APIC (SIO.A)," 137 pages, Mar., 1996.
Intel Corporation, "Intel 430HX PCIset; 82439HX System Controller (TXC) Timing Specification," 14 pages, Sep., 1996.
Intel Corporation, "8243OFX PCIset DataSheet 82437FX System Controller (TSC) and; 82438FX Data Path Unit (TDP)," 67 pages, Nov., 1996.
Intel Corporation, "82371FB (PIIX) and 82371SB (PIIX3); PCI ISA IDE Xcelerator," 122 pages, Apr. 1997.
Intel Corporation, "Intel 430HX PCISET; 82439HX System Controller (TXC)," 65 pages, Apr., 1997.

Primary Examiner—Albert De Cady
Assistant Examiner—David Ton
Attorney, Agent, or Firm—Dorsey & Whitney LLP

[57] ABSTRACT

A PCI/ISA computer system architecture is disclosed in which the ISA legacy circuitry (such as the interrupt request controller, DMA controller, and timer counter unit) is integrated within the system controller coupling the processor and PCI buses. Accordingly, the ISA bridge coupling the PCI and ISA buses is simplified relative to prior art PCI-ISA bridges. A high speed communications channel between the system controller and the ISA bridge is established by first placing an address on the PCI bus which is recognizable only by the system controller and the ISA bridge. Data transfer then occurs within standard PCI protocols, but need only require a subset of the A/D lines. Backwards compatibility is maintained, while system performance is improved and system cost is reduced.

19 Claims, 6 Drawing Sheets

SYSTEM FOR COMMUNICATING THROUGH A COMPUTER SYSTEM BUS BRIDGE

TECHNICAL FIELD

This invention relates generally to computer systems, and more particularly, to computer systems including industry standard architecture (ISA) devices.

BACKGROUND OF THE INVENTION

Computer systems, such as personal computers (PCs), typically include a number of individual components, such as a microprocessor, memory modules, various system and bus control units, and a wide variety of data input/output (I/O) and data storage devices. Advances in computer design have brought increased speed and capability to computer systems, while largely maintaining backwards compatibility with devices having less than state-of-the-art technology. The attempt to increase computer system capability and maintain backwards compatibility is evident upon inspection of today's most typical PC designs.

Figure 1:
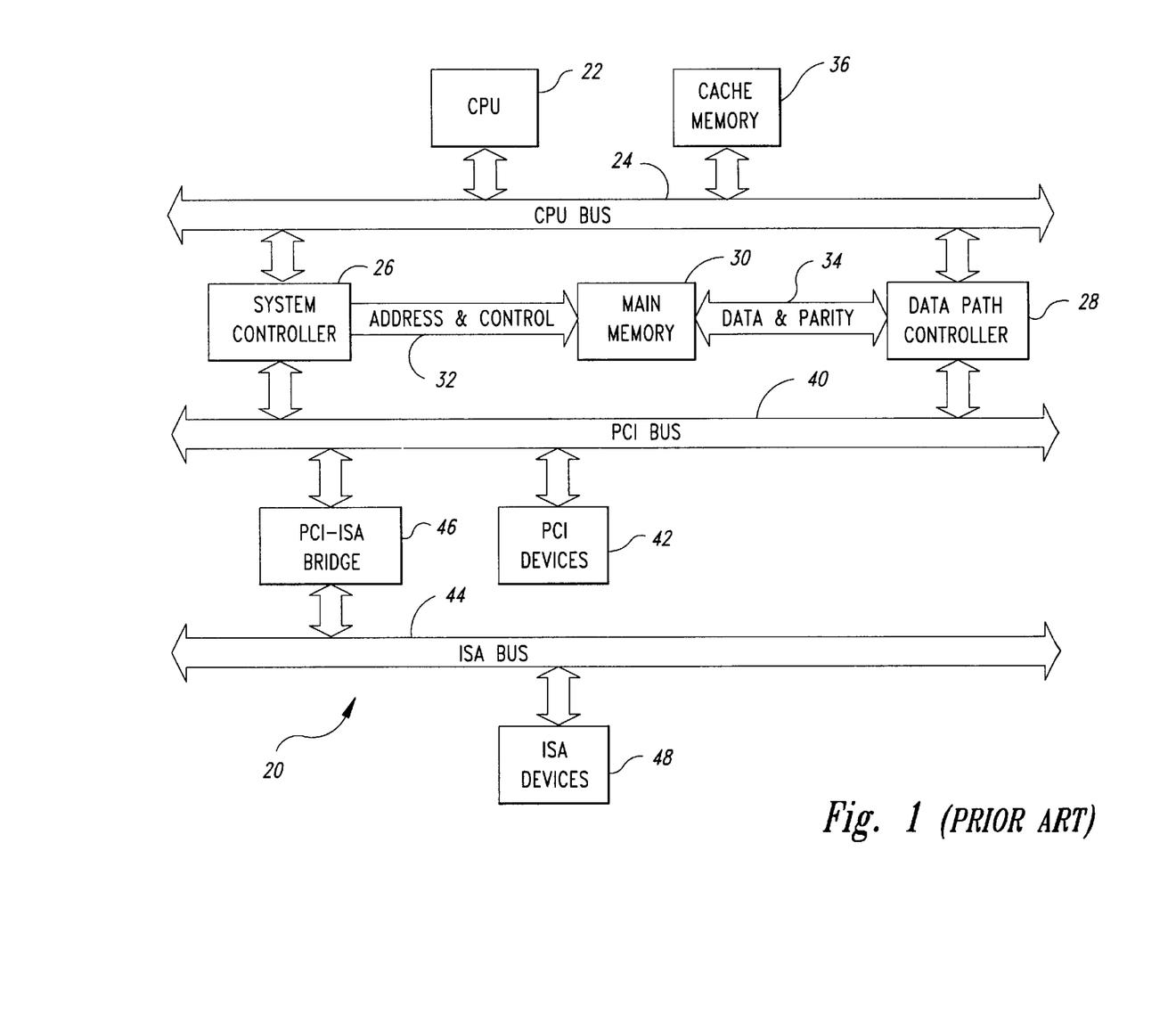
FIG. 1 is a functional block diagram of a computer system according to the prior art.

FIG. 1 depicts a typical personal computer system 20. A central processing unit (CPU) 22, such as the Intel® Pentium® microprocessor, is connected to a CPU bus 24 which carries address, data and control signals. The CPU bus 24 is connected to a system controller 26 and a data path controller 28. Well-known examples of system and data path controllers include the corresponding chips in the PicoPower® Vesuvius-LS and the Intel® Triton chipsets. The system controller 26 accesses a main memory 30 via a memory address and control bus 32. Typically, the main memory 30 includes a number of dynamic random access memory (DRAM) modules, such as FPM, EDO, and burst EDO DRAMs manufactured by Micron Technology, Inc. A data portion of the CPU bus 24 is coupled with the main memory 30 by a data and parity bus 34 and the data path controller 28. A cache memory 36 is connected to the CPU bus 24 and provides the CPU 22 with high speed access to a subset of the information stored in the main memory 30. Typically, the cache memory 36 includes static random access memory (SRAM) memory modules, such as those manufactured by Micron Technology, Inc.

The system controller 26 serves as a bridge circuit (sometimes called the north bridge) between the CPU bus 24 and a system bus, such as peripheral component interconnect (PCI) bus 40. One or more of a wide variety of PCI devices 42 are connected to the PCI bus 40. Well-known examples include a VGA controller, a CD-ROM drive circuitry module with SCSI controller, interface circuitry (such as a PCI-PCI bridge controller) coupling another bus system and associated devices to the PCI bus 40, and PCI expansion slots for future accommodation of other PCI devices not selected during the original design of the computer system.

The PCI bus 40 is coupled with an expansion bus, such as industry standard architecture (ISA) bus 44, by a south bridge, such as PCI-ISA bridge 46. One or more of a wide variety of ISA devices 48 are connected to the ISA bus 44. Well-known examples include a floppy disk drive circuitry module with direct memory access (DMA) controller, a keyboard/mouse controller, and ISA expansion slots for future accommodation of other ISA devices not selected during the original design of the computer system.

The multiple bus computer system architecture shown in FIG. 1 allows the CPU 22 to communicate at very high speed with the cache memory 36, while being buffered from the lower speed PCI devices 42 connected to the PCI bus 40, which in turn are buffered from the still slower ISA devices 48 connected to the ISA bus 44. As a general rule, the ISA devices 48 incorporate technology which was used in some of the earliest PC systems (i.e., PC AT and compatible systems), which at that time included only a single bus system connecting various devices to the CPU. The now traditional multiple bus architecture of FIG. 1 accommodates today's high speed CPUs and data I/O and storage devices, while maintaining the backwards compatibility with the older, slower ISA devices 48.

Figure 2:
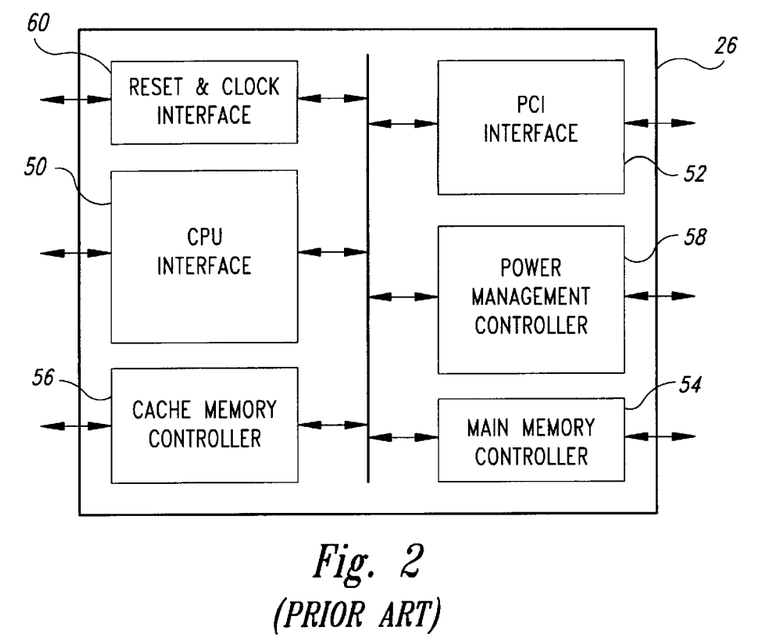
FIG. 2 is a functional block diagram of a system controller included in the computer system of FIG. 1.

FIG. 2 is a functional block diagram which depicts some of the circuits integrated within the system controller 26 of FIG. 1. CPU interface circuitry 50 interfaces the other components of the system controller 26 with the control and address signals associated with the CPU 22. Similarly, PCI interface circuitry 52 interfaces the other components of the system controller 26 with the control signals and associated protocol of the PCI bus 40. The system controller 26 also includes a main memory controller 54 which accesses the main memory 30, as described above. Similarly, a cache memory controller 56 accesses the cache memory 36. Typically, the system controller 26 also integrates a power management controller 58 and reset and clock interface circuitry 60, whose operation and function is well known in the art.

Figure 3:
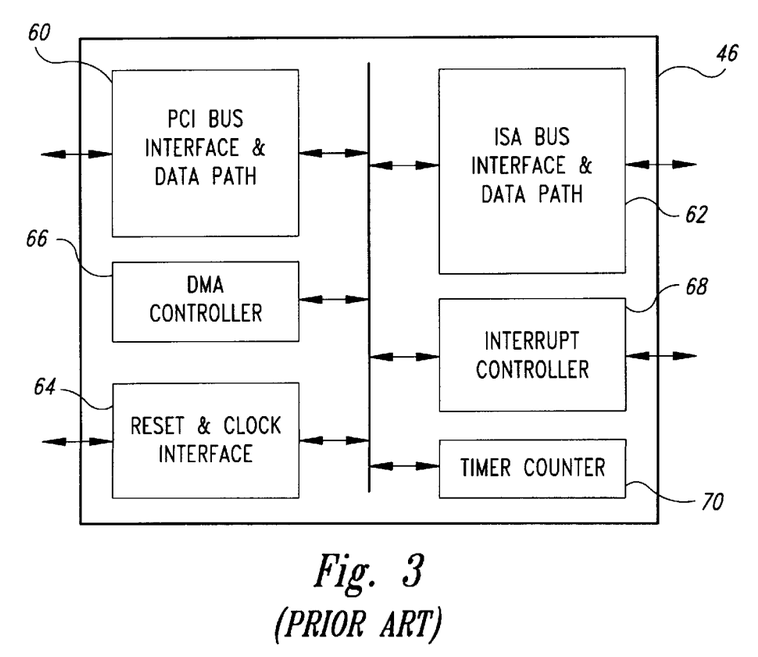
FIG. 3 is a functional block diagram of a PCI-ISA bridge included in the computer system of FIG. 1.

FIG. 3 is a functional block diagram which depicts some of the circuits integrated within the PCI-ISA bridge 46 of FIG. 1. PCI bus interface and data path circuitry 60 interfaces other components of the PCI-ISA bridge 46 with the control and address/data lines of the PCI bus. Similarly, ISA bus interface and data path circuitry 62 interfaces other components of the PCI-ISA bridge 46 with the control, address, and data lines of the ISA bus 44. The PCI-ISA bridge 46 also includes reset and clock interface circuitry 64, as is well known in the art. Additionally, well-known components oftentimes referred to as "ISA legacy circuits" are included in the PCI-ISA bridge 46. Examples of these ISA legacy circuits include a direct memory access (DMA) controller 66, an interrupt controller 68, and a timer counter unit 70. The DMA controller 66 receives DMA request signals from the ISA devices 48 and controls the block transfer of data between the ISA devices 48 and the main memory 30 (see FIG. 1), as is well known in the art. The interrupt controller 68 receives interrupt request signals from both the PCI devices 42 (via an interrupt router integrated within the PCI-ISA bridge 46) and the ISA devices 48, prioritizes those requests, and notifies the system controller 26 and/or CPU 22 of the needed service, as is well known in the art. The timer counter unit 70 measures time intervals associated with such activities as loud speaker control, time-of-day display, and various system events, as is well known in the art.

As shown in FIG. 1, the system controller 26 and data path controller 28 are each positioned between the CPU bus and PCI bus 40 and each are coupled with the main memory 30. Apparently, the cost and complexity of the computer system 20 could be reduced by integration of these components. Until recently, however, limitations on total pin count per chip made such integration difficult. New chip connection schemes, such as ball grid arrays, allow a higher pin count per chip, and new system controllers, such as the Intel® 82430HX system controller, now integrate the circuitry and functions of the system controller 26 and the data path controller 28 depicted in FIG. 1.

Improvement of CPUs and of the PCI and other local bus systems continues, with increased speed and system capability improvements. In the not too distant future, the ISA bus and associated devices will likely be eliminated. In the meantime, however, advances in computer system design must still provide for backwards compatibility to the ISA bus and associated devices. Today's computer designer strives for improved computer system performance and cost, but without loss of such backwards compatibility.

SUMMARY OF THE INVENTION

A PCI/ISA computer system architecture integrates ISA legacy circuitry (such as the interrupt request controller, DMA controller, and timer counter unit) within a system controller coupling a processor bus with a PCI bus. An ISA bridge couples the PCI bus with an ISA bus and includes PCI interface circuitry, ISA interface circuitry, and reset and clock interface circuitry. A high speed communications channel is established between the system controller and the ISA bridge by placing a predetermined address on the PCI bus which is recognizable only by the system controller and the ISA bridge. Data transfer then occurs within standard PCI protocols, but requires only a subset of the A/D lines. Backwards compatibility is maintained, while system performance is improved and system cost is reduced.

More generally, the present invention encompasses a multiple bus architecture computer system which includes a processor bus coupling a processor with a first bridge, a first bus coupling a second bridge with the first bridge, and a second bus coupling a bus device with the second bridge. A communication link is established between the first and second bridges by one of the bridges applying an address corresponding to the other bridge on the first bus. The other bridge then responds to receipt of the address to establish the communication link. Data transfer is then accomplished in accordance with standard bus protocols associated with the first bus, but need only require a subset of that bus.

The first bridge may include control logic circuitry associated with the bus device. Examples of such control logic circuitry include an interrupt request controller for receiving an interrupt request signal from the bus device to initiate a requested data transfer with the processor, and a DMA controller for receiving a DMA request signal to initiate a requested data transfer directly between the bus device and a memory.

DETAILED DESCRIPTION OF THE INVENTION

A computer system is described which integrates the ISA legacy circuitry within the system controller coupled between the CPU bus and the PCI bus. In the following description, specific details are set forth, such as specific microprocessor, memory, bus and other device types, in order to provide a thorough understanding of the preferred embodiment of the present invention. However, those skilled in the art will understand that the present invention may be practiced without these details. In other instances, well-known circuits and components have not been shown in detail in order not to unnecessarily obscure the invention. Similarly, those specific signals and timing protocols necessary to understand the invention are presented, while other well-known control signals and timing protocols are not described.

Figure 4:
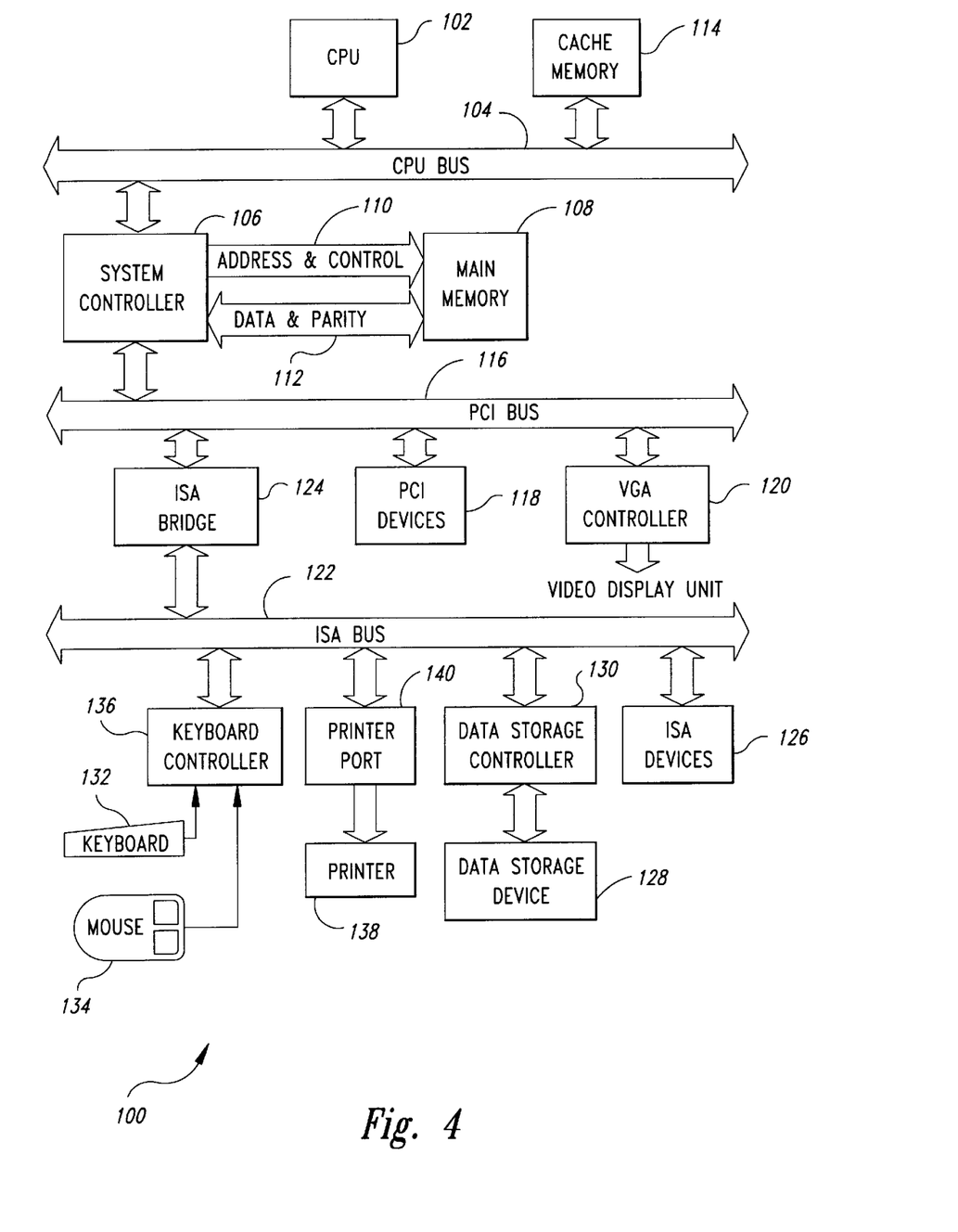
FIG. 4 is a functional block diagram of a computer system according to one embodiment of the present invention.

FIG. 4 depicts a multiple bus architecture computer system 100 according to one embodiment of the present invention. A microprocessor or CPU 102, such as an Intel®D Pentium® processor or Intel®D Pentium®t Pro processor, is connected to a CPU bus 104 which carries address, data, and control signals. The CPU bus 104 is connected to a north bridge or system controller 106. The system controller 106 accesses a main memory 108 via a memory address and control bus 110, and transfers data to and from the main memory via a memory data bus 112. The main memory 108 may include DRAM modules, such as those manufactured by Micron Technology, Inc., or may include any suitable temporary data storage circuitry. A cache memory 114 is connected to the CPU bus 104 and provides the CPU 102 with high speed access to a subset of the information stored in the main memory 108. The cache memory 114 may include SRAM modules, such as those manufactured by Micron Technology, Inc., or may include any suitable temporary data storage circuitry.

The system controller 106 serves as a bridge circuit between the CPU bus 104 and a relatively high bandwidth bus, such as PCI bus 116. One or more of a wide variety of PCI devices 118 is connected to the PCI bus 116. One well-known example of a PCI device is a data output device, such as a VGA controller 120 and associated video display unit. Other well-known examples include data storage devices, such as a CD-ROM drive circuitry module with an EIDE controller and a hard disk drive circuitry module with EIDE controller. Still other well-known examples include a SCSI controller and associated devices, a LAN adapter, interface circuitry (such as a PCI-PCI bridge controller) coupling another bus system and associated devices to the PCI bus 116, and PCI bus slots for future accommodation of other PCI devices not selected during the original design of the computer system.

The PCI bus 116 is coupled with a relatively low bandwidth bus, such as ISA bus 122, by a south bridge, such as ISA bridge 124. One or more of a wide variety of ISA devices 126 are connected to the ISA bus 122. Well-known examples include a data storage device 128 and associated controller 130, such as a floppy disk drive with DMA controller or a hard disk drive with IDE controller. Other well-known examples include data input devices, such as a keyboard 132 and a pointing device 134 with a keyboard/mouse controller 136. Still other well-known examples include data output devices, such as a printer 138 with printer port 140, and ISA bus slots for future accommodation of other ISA devices not selected during the original design of the computer system.

Figure 5:
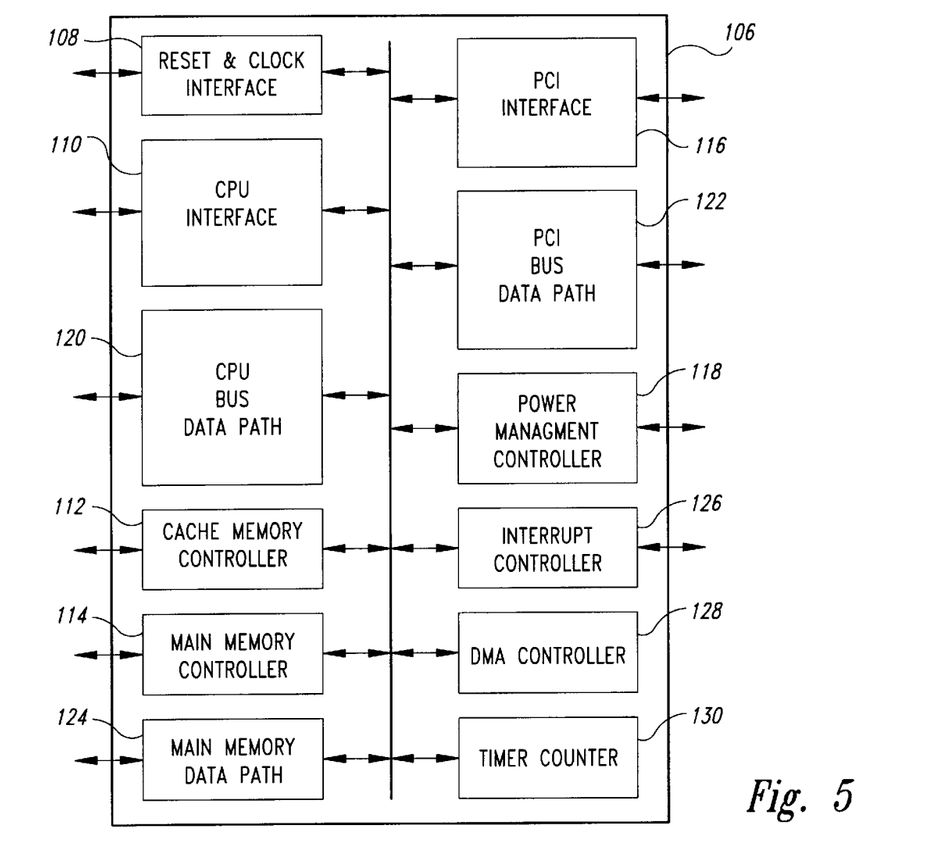
FIG. 5 is a functional block diagram of a system controller included in the computer system of FIG. 4.

In accordance with one embodiment of the present invention, and as shown in FIG. 5, the system controller 106 includes reset and clock interface circuitry 108, CPU interface circuitry 110, a cache memory controller 112, a main memory controller 114, PCI interface circuitry 116, and a power management controller 118—all of which function as described above in connection with the prior art system controller 26 (see FIGS. 1 and 2). The system controller 106 also includes CPU bus data path circuitry 120, PCI bus data path circuitry 122, and main memory data path circuitry 124—circuitry which is included in the prior art data path controller 28 (see FIG. 1) and whose function and operation is well known. Importantly, the system controller 106 also integrates ISA legacy circuitry included in the prior art PCI-ISA bridge circuit 46 (see FIGS. 1 and 3), such as an interrupt controller 126, a DMA controller 128, and a timer counter unit 130.

Figure 6:
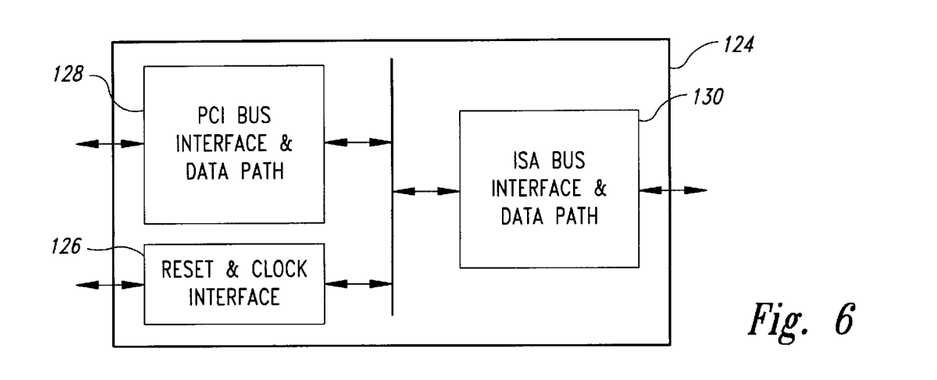
FIG. 6 is a functional block diagram of an ISA bridge circuit included in the computer system of FIG. 4.

In accordance with one embodiment of the present invention, and as shown in FIG. 6, the ISA bridge 124 includes the well-known interface circuitry, such as reset and clock interface circuitry 126, PCI bus interface and data path circuitry 128, and ISA bus interface and data path circuitry 130. Importantly, the ISA bridge 124 does not include the ISA legacy circuitry—circuitry which is now integrated within the system controller 106.

Those skilled in the art will appreciate a number of advantages achieved by integrating the ISA legacy circuitry within the system controller 106. For example, the ISA bridge 124 is considerably reduced in cost and complexity relative to the prior art PCI-ISA bridge 46. Also, the cost of the computer system 100 is reduced relative to prior art computer systems by virtue of the reduced signal and pin count accomplished by integrating all of the core logic circuitry within a single chip-namely, the system controller 106. Further, system performance improves because of reduced latency from the CPU to the ISA legacy logic circuitry.

The prior art system controller 26 of FIG. 1 addresses one of the ISA devices 48 by placing the address on the PCI bus 40. The PCI-ISA bridge 46 employs a subtractive decoding method for recognizing that address and responding to the system controller 26. Subtractive decoding amounts to the PCI-ISA bridge 46 waiting for a sufficient time to determine that none of the PCI devices 42 recognizes the address placed on the PCI bus 40 by the system controller 26. Typically, this involves waiting two or more PCI clock cycles.

In contrast, one embodiment of the present invention allows the ISA bridge 124 of FIG. 4 to immediately respond to a corresponding address placed on the PCI bus 116 by the system controller 106. The PCI interface circuitry 116 of the system controller 106 and the PCI bus interface and data path circuitry 128 of the ISA bridge 124 may each include registers, or other suitable storage means, to provide a predetermined address for establishing a communications link between the system controller 106 and the ISA bridge 124. These registers may be programmed during execution of power-on self-test and system initialization routines or programmed in non-volatile storage means during assembly of the computer system. The predetermined address may be a memory address or other address not recognizable by any of the PCI devices 118 which may be connected to the PCI bus 116 (see FIG. 4). In this way, a communications link is established between the system controller 106 and the ISA bridge 124 without the latency associated with prior art design.

The system controller 106 and the ISA bridge 124 then communicate and exchange data according to well-known PCI protocols. The various devices connected to the ISA bus are quite slow relative to the speed of the PCI bus 116, and the ISA bus carries only 16 bits of data compared to the 32 bits carried by the PCI bus. Therefore, only a portion of the A/D (address/data) lines of the PCI bus 116 need be dedicated to connect the system controller 106 with the ISA bridge 124. This, together with the location of ISA legacy circuitry in the system controller 106, considerably reduces the cost and complexity of the ISA bridge 124.

Whenever a data transfer with an ISA device 126 occurs, the ISA legacy circuitry (i.e., the interrupt controller 126, DMA controller 128, and timer counter unit 130) may function as in conventional systems. Therefore, well-known PCI protocols can govern communications between the ISA legacy circuits and other circuits integrated within the system controller 106. Alternatively, hardware decoders coupled with the CPU bus 104 may be employed in a manner similar to early PC design with a single bus system. Those skilled in the art will appreciate how to implement either the PCI protocol internal to the system controller 106 or the use of hardware decoders coupled with the CPU bus 104, and no further description is necessary.

Those skilled in the art will appreciate that the embodiment of the present invention described in connection with FIGS. 5 and 6 may be modified within the scope of the invention. The system controller 106 of FIG. 5 integrates the circuitry necessary to dispense with a data path controller as a separate chip in the computer system (such as the data path controller 28 of FIG. 1). Similarly, the system controller 106 of FIG. 5 integrates substantially all of the ISA legacy circuitry included in prior art PCI-ISA bridge circuits (such as the PCI-ISA bridge 46 of FIGS. 1 and 3). In accordance with the present invention, a system controller need not include all of the circuitry depicted in FIG. 5 and may include only a portion of the ISA legacy circuitry.

FIGS. 7–10 are timing diagrams which depict certain details of read and write operations performed by the computer system 100 of FIG. 4. The timing diagrams refer to the exemplary PCI bus 116 and associated signals. In the discussion below, it is understood that the well-known PCI signals FRAME#, A/D (31:16), IRDY#, and TRDY# are each communicated on a corresponding one or more signal lines of the PCI bus 116 of FIG. 4. FIGS. 7–10 do not show details of PCI bus arbitration, nor are other well known PCI signals shown, such as command/byte enable signals, device select signals, etc.—signals whose states and timing for the depicted operations are apparent to one skilled in the art.

Figure 7:
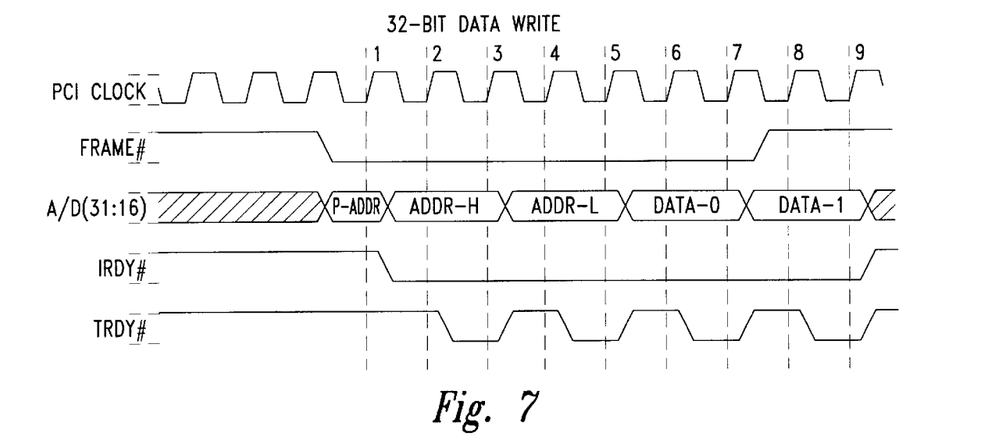
FIG. 7 is a timing diagram which depicts a data write operation performed by the computer system of FIG. 4.

FIG. 7 is a timing diagram which depicts a write operation of one embodiment of the invention in which the CPU 102 writes data to a device connected to the ISA bus 122. The system controller 106 initiates the PCI transaction by asserting FRAME# and driving the predetermined address P-ADDR on the designated portion of the A/D lines of the PCI bus 116 to which the ISA bridge 124 is connected. This address is sampled by the ISA bridge 124 at the rising edge of PCI clock 1, and a communications link between the system controller 106 and the ISA bridge is established. The system controller then addresses the ISA device to which data is to be written. Because devices connected to the ISA bus 122 are 16 data bit devices, FIG. 7 depicts (as do FIGS.

Figure 8:
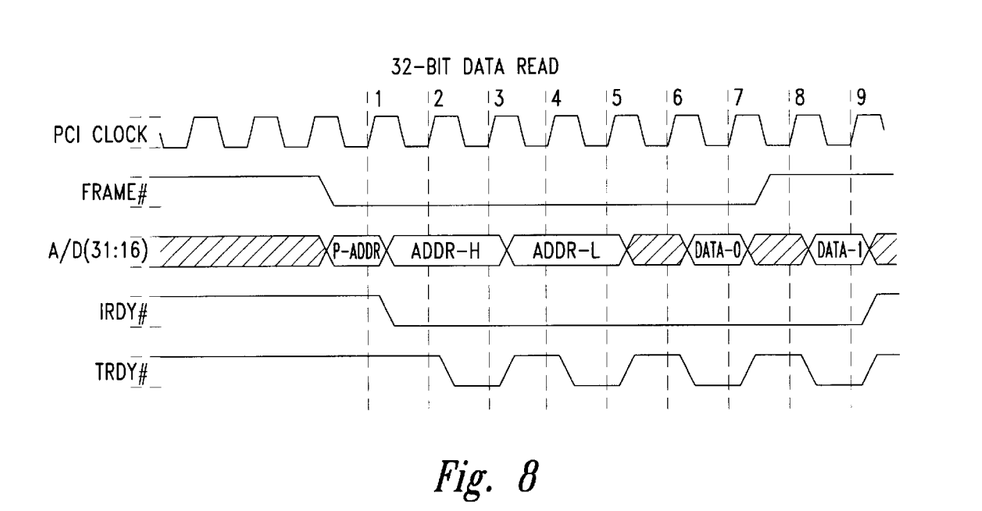
FIG. 8 is a timing diagram which depicts a data read operation performed by the computer system of FIG. 4.
Figure 9:
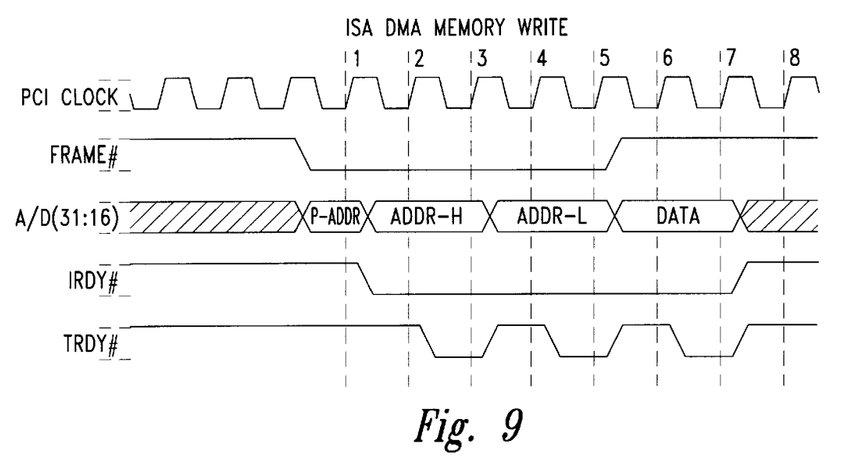
FIG. 9 is a timing diagram which depicts a DMA memory write operation performed by the computer system of FIG. 4.
Figure 10:
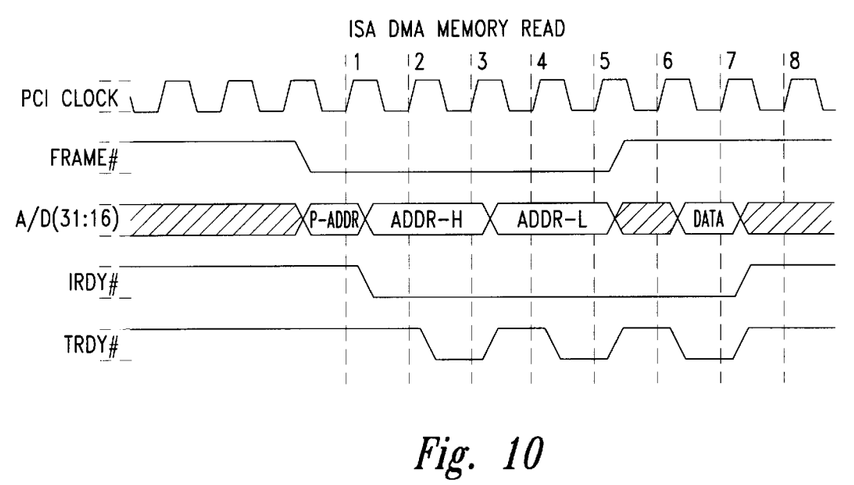
FIG. 10 is a timing diagram which depicts a DMA memory read operation performed by the computer system of FIG. 4.

8–10) the use of only 16 of the 32 available A/D lines of the PCI bus 116. However, devices connected to the ISA bus 122 are addressable with 24 address bits. Therefore, addressing of the ISA device occurs in multiple stages with the system controller 106 first placing the higher address bits ADDR-H on the A/D lines, and then the lower address bits ADDR-L.

During clock cell 1, the system controller 106 asserts the IRDY# signal. The ISA bridge 124 then samples IRDY# as asserted at the rising edge of clock 2. In response, the ISA bridge 124 toggles the TRDY# signal at a rate which is one-half the frequency of the PCI clock. The lower frequency accommodates the slower ISA bus 122 while maintaining synchronous coupling of the ISA bus with the PCI bus 116. Also, by simply toggling the TRDY# signal, a less complex (and less expensive) ISA bridge 124 is required, in that TRDY# can be provided by a simple state machine. Of course, the depicted toggle rate is just one example. In the event of a higher bandwidth PCI or other local bus, another suitable toggle rate may be chosen, such as one-fourth the frequency of the local bus clock.

The ISA bridge 124 samples the higher address bits ADDR-H at the rising edge of clock 3 and the lower address bits ADDR-L at the rising edge of clock 5. Subsequently, the system controller places the first 16 bits of data DATA-0 on the A/D lines, which are then latched by the ISA bridge 124 at the rising edge of clock 7 for provision to the addressed ISA device via the ISA bus 122. The system controller 106 then deasserts FRAME#, indicating that the system controller is ready to complete the last data phase, and the last 16 bits of data DATA-1 are then latched by the ISA bridge 124 at the rising edge of clock 9 for provision to the addressed ISA device via the ISA bus 122. FIG. 7, therefore, depicts a 32 bit data write to a 24 bit addressable ISA device. Of course, those skilled in the art will appreciate how to apply the operation depicted in FIG. 7 to more or fewer than 16 of the PCI A/D lines to accomplish a 32 or other-numbered bit data write operation to an ISA device.

FIG. 8 depicts an operation of one embodiment of the invention in which the CPU 102 reads 32 bits of data from a device connected to the ISA bus 122. The system controller 106 initiates the PCI transaction by asserting FRAME# and addresses the ISA bridge 124 by driving the predetermined address P-ADDR on the designated portion of the A/D lines of the PCI bus 116. The ISA bridge 124 samples this predetermined address at the rising edge of PCI clock 1, and a communications link between the system controller 106 and the ISA bridge is established. During clock cell 1, the system controller 106 asserts IRDY# and begins addressing the ISA device by driving the higher address bits ADDR-H onto the AID lines. The ISA bridge 124 samples IRDY# asserted and subsequently toggles TRDY# at a frequency half that of the PCI clock. The ISA bridge 124 samples the higher address bits ADDR-H at the rising edge of clock 3 and the lower address bits ADDR-L at the rising edge of clock 5. The ISA bridge 124, having begun data retrieval from the addressed ISA device via the ISA bus 122, places the first 16 bits of data DATA-0 on the A/D bus, and the system controller 106 latches this data at the rising edge of clock 7 for provision to the CPU 102 via the CPU bus 104. The system controller 106 then deasserts FRAME#, indicating that the system controller is ready to complete the last data phase, and the last 16 bits of data DATA-1 are latched by the system controller at the rising edge of clock 9 for provision to the CPU 102 via the CPU bus 104.

FIGS. 9 and 10 depict DMA operations of one embodiment of the invention in which data is transferred between an ISA device and the main memory 108. The ISA bridge 124 is then the PCI initiator and the system controller 106 is the PCI target. Referring to FIG. 9, the ISA bridge 124 asserts FRAME# and addresses the system controller 106 by driving the predetermined address P-ADDR on the designated portion of the A/D lines of the PCI bus 116. FIG. 9 depicts 32 bit memory addressing in which the memory location is specified by a sequence of higher address bits ADDR-H and lower address bits ADDR-L, as shown. Because the ISA bus 122 operates at considerably slower speeds than the PCI bus, the system controller 106 may simply toggle TRDY# at a rate one-half that of the PCI clock (as described above when the ISA bridge 124 is the PCI target). The system controller 106 initiates toggling of TRDY# in response to sampling IRDY# asserted by the ISA bridge 124 at the rising edge of clock 2. The higher and lower address bits ADDR-H and ADDR-L are then latched by the system controller 106 at the rising edge of clock 3 and of clock 5, respectively. The ISA bridge 124 deasserts FRAME# to indicate its readiness to complete the data phase, and 16 bits of data (read from the ISA device and placed on the PCI bus 116 by the ISA bridge 124) are latched by the system controller 106 at the rising edge of clock 7 for provision to the addressed location in the main memory 108.

FIG. 10 depicts a DMA memory read operation of one embodiment of the invention. The ISA bridge 124 starts the transaction by initiating FRAME# and addressing the system controller 106 by driving the predetermined address P-ADDR onto the designated portion of the A/D lines of the PCI bus 116. The ISA bridge 124 then asserts IRDY#, which is sampled asserted by the system controller 106 at the rising edge of clock 2. In response, the system controller 106 toggles the TRDY# signal at a frequency one-half of that of the PCI clock. As in the example depicted in FIG. 9, 32 bit memory addressing occurs in which the higher address bits ADDR-H are latched by the system controller 106 at the rising edge of clock 3, and the lower address bits ADDR-L are latched at the rising edge of clock 5. The ISA bridge 124 then deasserts FRAME# to indicate its readiness to complete the data phase, and 16 bits of data (read from memory and placed on the PCI bus 116 by the system controller 106) are latched by the ISA bridge 124 at the rising edge of clock 7 for provision to the ISA device.

Those skilled in the art will appreciate that the described embodiments of a computer system according to the present invention achieve a number of important advantages. By integrating the ISA legacy circuitry within the system controller 106, a far simpler and less expensive ISA bridge 124 results. Also, total system cost is reduced by virtue of reduced pin and signal count for the complete core logic circuitry. Important time advantages are reaped by eliminating the subtractive decoding method by which prior art PCI-ISA bridges claim a transaction on the PCI bus. The described embodiments of a computer system according to the present invention provide performance improvements, at lower system cost, while maintaining complete backwards compatibility to the slower ISA bus and associated devices. Communication between the system controller 106 and the ISA bridge 124 is accomplished in accordance with well known PCI protocols, but requires only a portion of the PCI bus 116 dedicated to that task, thereby reducing pin and signal line count, and associated expense.

It will be appreciated that, although embodiments of the invention have been described for purposes of illustration, various modifications may be made without deviating from the spirit and scope of the invention. A particular processor and system bus type have been described. However, those skilled in the art will appreciate that any number of well known processor and bus types could be employed according to the present invention. For example, and without limitation, any of a variety of well-known or subsequently developed local bus structures could be substituted for the described PCI bus. Similarly, the integration of ISA control logic circuitry within the system controller 106 could instead encompass the integration of similar control logic circuitry associated with other expansion busses, such as EISA or MCA bus systems. In general, the present invention teaches improved performance and reduced system cost for any of a number of multiple bus architectures. Particular examples have been given in which certain numbered bit addressing and data transfers occur over a particular designated portion of a local bus. However, those skilled in the art will appreciate that the present invention encompasses other-numbered bit addressing and data transfers over the same or other designated portion of a local bus. Indeed, numerous variations are well within the scope of this invention. Accordingly, the invention is not limited except as by the appended claims.

I claim:

1. A computer system having a multiple bus architecture, comprising:

a processor;

a processor bus coupled with the processor and operable to transfer data, address and control signals;

a first bridge coupling the processor bus with a first bus and operable to transfer data and address signals between the processor bus and the first bus;

a second bridge coupling the first bus with a second bus and operable to transfer data and address signals between the first bus and the second bus; and wherein the first bridge and the second bridge are configured to store a predetermined address that is not recognized by any device coupled to the first bus to establish a dedicated communication link in response to receiving the predetermined address.

2. The computer system of claim 1 wherein the first and second bridges are each operable to store a predetermined address, the second bridge being operable to produce a signal in response to receipt of the predetermined address produced by the first bridge, and the first bridge being operable to produce a signal in response to receipt of the predetermined address produced by the second bridge.

3. The computer system of claim 1 wherein the first bus includes a plurality of data and address lines, and wherein the second bridge is operable to transfer the data and address signals between the second bus and a portion of the data and address lines.

4. The computer system of claim 1 wherein the first bus is a PCI bus.

5. The computer system of claim 1 wherein the second bus is an ISA bus.

6. The computer system of claim 1 wherein the second bus is an ISA bus, and wherein the first bridge includes an interrupt controller operable to receive an interrupt request signal from a device connected to the ISA bus.

7. The computer system of claim 1 wherein the second bus is an ISA bus, and wherein the first bridge includes a DMA controller operable to receive a DMA request signal from a device connected to the ISA bus.

8. The computer system of claim 1, further comprising:

a memory coupled with the processor and operable to transfer data to and from the processor, the memory also being operable to store data at a plurality of locations addressable by the processor; and wherein the predetermined address is an address of a location in the memory.

9. The computer system of claim 8 wherein the memory is coupled with the processor through the first bridge and the processor bus.

10. A computer system having a multiple bus architecture, comprising:

a processor bus coupling a processor with a first bridge and transferring data and address signals between the processor and the first bridge;

a first bus coupling a second bridge with the first bridge and transferring data and address signals between the second bridge and the first bridge;

a second bus coupling a bus device with the second bridge and transferring data and address signals between the bus device and the second bridge; and the first bridge comprising ISA legacy circuitry, and the second bridge comprising interface circuitry, wherein the first bridge and the second bridge are configured to store a predetermined address that is not recognized by any device connected to the first bus to establish a dedicated communication link in response to address signals between the second bridge and the first bridge.

11. The computer system of claim 10 wherein the second bus includes an ISA bus and the ISA legacy circuitry includes an interrupt request controller.

12. The computer system of claim 10 wherein the second bus includes an ISA bus and the ISA legacy circuitry includes a DMA controller.

13. A computer system having a multiple bus architecture, comprising:

a processor;

a processor bus coupled with the processor and operable to transfer data, address and control signals;

a system controller coupling the processor bus with a local bus and operable to transfer data and address signals between the processor bus and the local bus;

a memory coupled with the system controller and operable to store data at a plurality of locations addressable by the processor;

a bridge coupling the local bus with an ISA bus and operable to transfer data and address signals between the local bus and the ISA bus, the bridge including interface circuitry and having the absence of an interrupt request controller and an OMA controller;

an ISA device coupled with the ISA bus and operable to assert an interrupt request signal requesting service from the processor and a DMA request signal requesting a block transfer of data with the memory; and wherein the system controller includes:

an interrupt request controller operable to receive the interrupt request signal to initiate the requested service; and a DMA controller operable to receive the DMA request signal to initiate the requested block transfer, wherein the system controller and the bridge are configured to store a predetermined address that is not recognized be any device connected to the local bus to establish a dedicated communications link between the system controller and the bridge.

14. The computer system of claim 13 wherein the local bus is a PCI bus.

15. The computer system of claim 14 wherein the PCI bus includes a plurality of A/D lines, and wherein the bridge couples the ISA bus with fewer than all of the A/D lines.

16. A system controller adapted for use in a computer system to couple a processor with a bridge circuit coupled to a bus device, the system controller comprising:

processor interface circuitry;

bridge interface circuitry; and

ISA legacy circuitry associated with the bus device, wherein the bridge interface circuitry is configured to store a predetermined address that is not recognized by the bus device to establish a dedicated communications link with the bridge circuit.

17. The system controller of claim 16 further adapted to couple the processor with a memory, and wherein the predetermined address is a memory address.

18. The system controller of claim 16 wherein the ISA legacy circuitry includes an interrupt request controller.

19. The system controller of claim 16 wherein the ISA legacy circuitry includes a direct memory access controller.

* * * * *